United States Patent [19]

Hansen

[11] Patent Number: 4,879,676
[45] Date of Patent: Nov. 7, 1989

[54] METHOD AND APPARATUS FOR PRECISE FLOATING POINT EXCEPTIONS

[75] Inventor: Craig C. Hansen, Mountain View, Calif.

[73] Assignee: MIPS Computer Systems, Inc., Sunnyvale, Calif.

[21] Appl. No.: 161,543

[22] Filed: Feb. 29, 1988

[51] Int. Cl.[4] ............................................. G06F 7/48
[52] U.S. Cl. .................................................. 364/748
[58] Field of Search ........................................ 364/748

[56] References Cited

U.S. PATENT DOCUMENTS 4,773,035 9/1988 Lee et al. ............................ 364/748
4,788,655 11/1988 Nakayama et al. ................. 364/748

OTHER PUBLICATIONS

Matsui et al, "An Overflow/Underflow–Free Floating-Point Representation of Numbers", *J. of Infor. Processing*, vol. 4, No. 3, 1981, pp. 123–133.

*Primary Examiner*—David H. Malzahn
*Attorney, Agent, or Firm*—Townsend and Townsend

[57] ABSTRACT

In data processing systems of the type operable to perform floating point computations there is provided a method, and apparatus implementing that method, for predicting, in advance of the floating point computation, whether or not the computation will produce a floating point exception (e.g., overflow, underflow, etc.). The prediction method includes the steps of combining the exponent fields of the operands of the computation in a manner dictated by the type of operation (i.e., add, subtract, multiply, etc.), and comparing that combination, together with an indication of the computation to be performed (e.g., add, substract, multiply, or divide), to obtain an indication of the possibility of the computation ending in a floating point exception. If an exception is predicted, the indication can be used to halt other data processing operations until completion of the computation so that, in the event the computation actually results in a floating point exception, the handling of the exception can be accomplished with a minimum of effort.

6 Claims, 3 Drawing Sheets

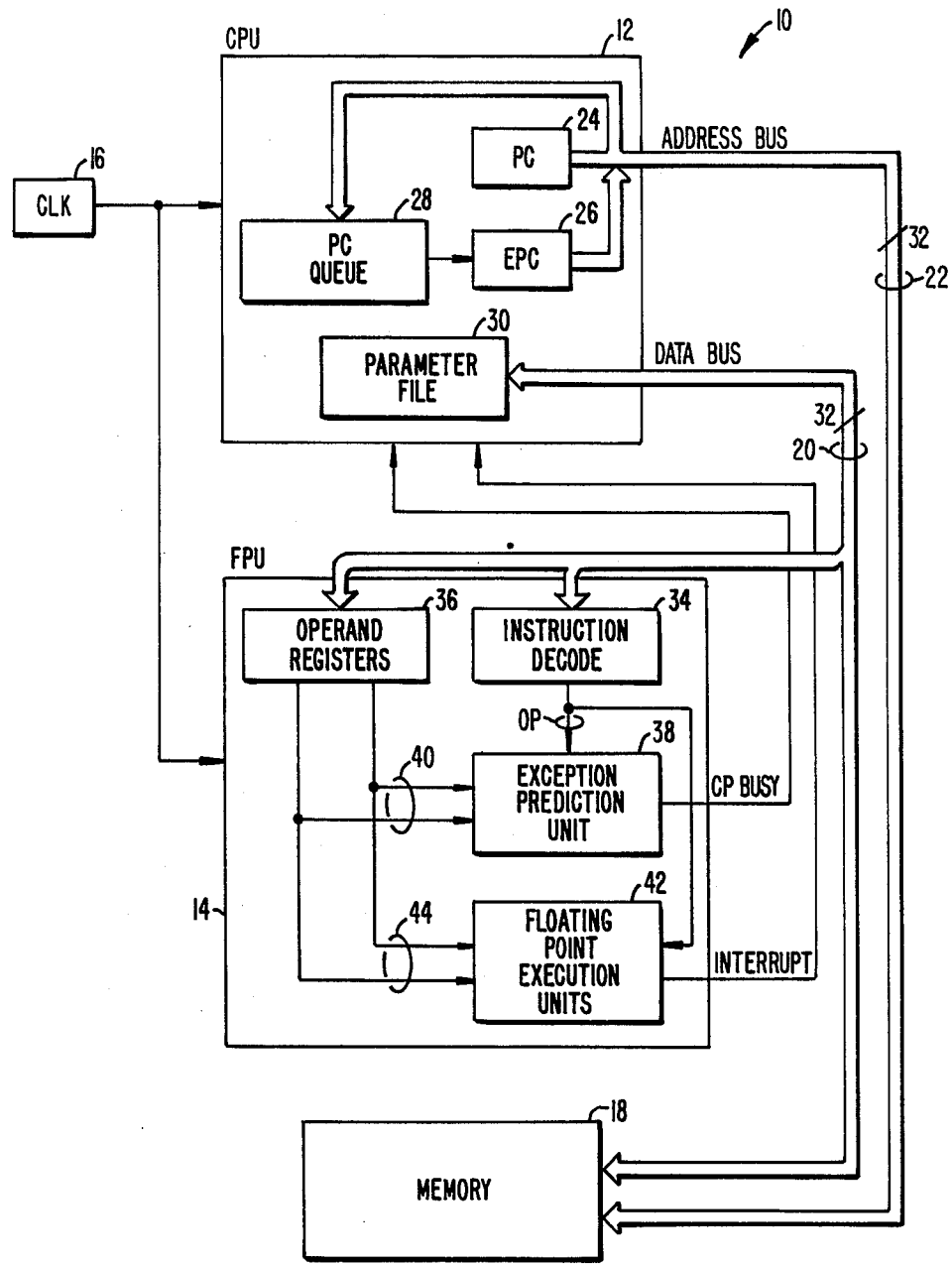
FIG._1.

|     | 111 | 110 | 101 | 100 | 011 | 010 | 001 | 000 |
|-----|-----|-----|-----|-----|-----|-----|-----|-----|
| 111 | X   | X   | X   | X   | X   | X   | X   | X   |
| 110 | X   | X   | X   | X   |     |     |     | X   |
| 101 | X   | X   | X   |     |     |     |     | X   |
| 100 | X   | X   |     |     |     |     |     | X   |
| 011 | X   |     |     |     |     |     | X   | X   |
| 010 | X   |     |     |     |     | X   | X   | X   |
| 001 | X   |     |     |     | X   | X   | X   | X   |
| 000 | X   | X   | X   | X   | X   | X   | X   | X   |

POSSIBLE EXCEPTION-CAUSING OPERANDS FOR MULTIPLY.

FIG._2A.

|     | 111 | 110 | 101 | 100 | 011 | 010 | 001 | 000 |
|-----|-----|-----|-----|-----|-----|-----|-----|-----|
| 111 | X   | X   | X   | X   | X   | X   | X   | X   |
| 110 | X   |     |     |     | X   | X   | X   | X   |
| 101 | X   |     |     |     | X   | X   | X   | X   |
| 100 | X   |     |     |     |     | X   | X   | X   |
| 011 | X   | X   |     |     |     |     |     | X   |
| 010 | X   | X   | X   |     |     |     |     | X   |
| 001 | X   | X   | X   | X   |     |     |     | X   |
| 000 | X   | X   | X   | X   | X   | X   | X   | X   |

POSSIBLE EXCEPTION-CAUSING OPERANDS FOR DIVIDE.

FIG._2B.

|     | 111 | 110 | 101 | 100 | 011 | 010 | 001 | 000 |
|-----|-----|-----|-----|-----|-----|-----|-----|-----|
| 111 | X   | X   | X   | X   | X   | X   | X   | X   |
| 110 | X   |     |     |     |     |     |     | X   |
| 101 | X   |     |     |     |     |     |     | X   |
| 100 | X   |     |     |     |     |     |     | X   |
| 011 | X   |     |     |     |     |     |     | X   |
| 010 | X   |     |     |     |     |     |     | X   |
| 001 | X   |     |     |     |     |     |     | X   |
| 000 | X   | X   | X   | X   | X   | X   | X   | X   |

POSSIBLE EXCEPTION-CAUSING OPERANDS FOR ADD/SUBTRACT

FIG._2C.

| 111 | 110 | 101 | 100 | 011 | 010 | 001 | 000 |
|-----|-----|-----|-----|-----|-----|-----|-----|-----|
| X   |     |     |     |     |     |     | X   |

POSSIBLE EXCEPTION-CAUSING OPERANDS FOR UNARY OPERATIONS.

FIG._2D.

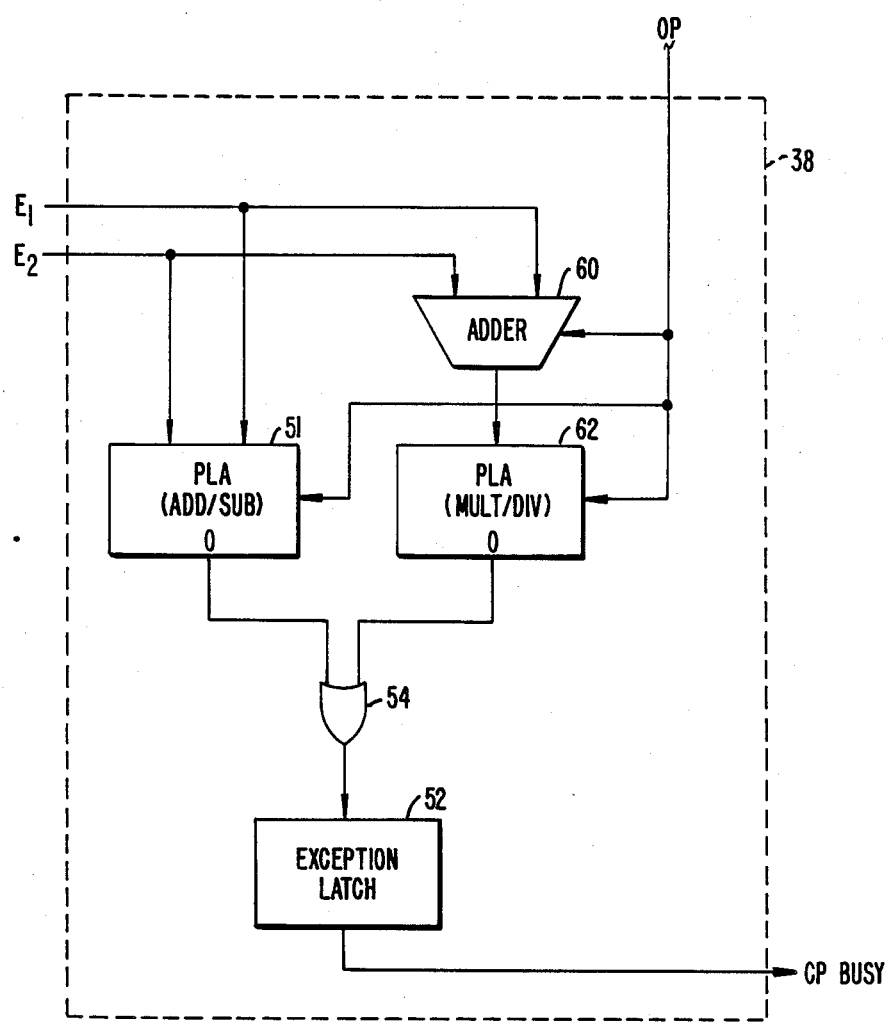
FIG._3.

METHOD AND APPARATUS FOR PRECISE FLOATING POINT EXCEPTIONS

BACKGROUND OF THE INVENTION

The invention is directed generally to data processing apparatus having some form of parallel or pipelined architecture, and including floating point computations, and more particularly to a method and apparatus for handling precise floating point exceptions in such pipelined architecture.

Computing apparatus today, particularly those for scientific and engineering uses, more often than not perform computations with "floating point" numbers. One advantage of floating point numbers is that they allow computations where the range of the magnitude of the numbers is very large, larger than can be handled, for example, with fixed point numbers except with great difficulty. Floating point representation of numbers corresponds very closely to what is often termed "scientific notation," each being represented as the product of a normal number with a radix point and an integral power of the radix. Thus, for example, a number might be represented as:

$$6318 \times 10^2.$$

The number, 6318, is called the "fractional" part, and the 2 is called the "exponent" part. In digital representation:

$$0000.1100010101110$$

where the most significant bit is the sign, the next three bits form the exponent field, and the remaining bits form the fraction field.

While floating point numbers and floating point computation provide significant advantages over fixed point numbers and computations, they are not without certain problems. One such problem may occur when the magnitude of the result of a floating point computation exceeds or "overflows" the capacity of the floating point number system. This problem, conventionally referred to as a floating point "exception," requires special handling when discovered (such as the setting of an indicator that a programmer can test to stop the computation with an appropriate error message).

Other exceptions include "underflow," which results from the attempt to produce a non-zero result too small (in magnitude) to be accommodated; or an "inexact" exception in which, because of the results size, rounding must be accomplished creating possible inaccuracies.

There exist today many methods and techniques for handling a floating point exception, when it occurs, all of which are well known. However, particular problems arise when floating point computations are used in data processing systems capable of some form of parallel processing such as is found in pipelined architecture. Pipelined architecture usually encompasses processor designs in which multiple instructions are in various stages of execution, all at the same time. When a floating point instruction culminates in a floating point exception, the special handling necessary requires that the floating point instruction be re-executed, but only after the operands are adjusted to avoid the exception occurring again. However, to re-execute the floating point instruction, the data processing apparatus must be "backed up," so to speak, which means that the results of any instructions executed, or partially executed, during the execution of the floating point instruction must be saved until later, or thrown away. This, in turn, requires the "state" of the data processing apparatus to be returned to that originally encountered by the instruction.

The problem is exacerbated when different instructions require different execution times; that is, when certain instructions can be executed in two, four, or a small number of processor cycles of operation, whereas other instructions, particularly floating point instructions, require many more processor cycles of operation to completion. In this case, a floating point computation that results in an exception is much more difficult to "back out" of. That is, it is much more difficult to restore the state of the data processing apparatus to that originally encountered by the instruction in order to avoid the float-point exception.

One obvious solution to these problems would be to halt the processing of any subsequent instruction when a floating point computation is first encountered, allowing only the floating point computation to proceed. A check of the result can then be made to determine if an exception has occurred. If not, normal processing resumes; if an exception has occurred, the computation can be redone without having to "flush" the pipeline (i.e., to discard or store the results of the pipeline insofar as instructions following the floating point instruction are concerned). This scheme, however, can significantly affect the performance of the data processing system.

SUMMARY OF THE INVENTION

To alleviate these problems, a method, and apparatus implementing that method, is provided in which an early "prediction" of whether or not a floating point exception could occur is made. If the prediction indicates an exception may occur, all other processing is temporarily halted, and the floating point computation allowed to proceed to completion. If the computation completes in an exception, the operands are adjusted, and the computation started again. The second computational run is with the foreknowledge that an exception will not occur so that all other processing is allowed at the same time. If, on the other hand, the prediction indicates no exception will occur, the processing continues normally.

According to the method of the present invention, when a floating point instruction is encountered, the exponent fields of the operands to be involved in the computation are compared to predetermined criteria for that operation. The comparison results in a prediction of whether or not a floating point exception will or could occur. If the prediction is that a floating point exception could or will occur, all other processing (except for the floating point computation) is halted and the floating point computation allowed to proceed to completion. If an exception actually occurred, the instruction can be re-executed (at the option of the one creating the program - and depending upon the type of operation), this time however with the foreknowledge that the operands must be modified to avoid an exception occurring. Thus, the float point computation may be preceded by an exception-handling routine, and the floating point computation re-executed using the now modified operands. This second execution of the floating point instruction is done in the parallel processing environment of the pipeline, since there is no longer any chance of an exception occurring using the adjusted operands.

In the preferred embodiment of the invention, the exponent fields of the operands to be used in the floating point multiply (or divide) computation are added to (or subtracted from) one another, and the result, together with an indication of the operation (e.g., multiply, or divide), are applied to a programmable logic array. The programmable logic array is programmed to produce a floating point exception signal if the resultant value produced by this combination of the exponent fields of the operands indicate that the floating point computation will or could result in a floating point exception. The floating point exception signal operates to temporarily halt all other parallel processing functions, allowing the floating point computation to proceed to completion. If, however, the prediction is that no exception will occur, the parallel processing operations can be continued with no concern for a floating point exception occurring. The prediction for floating point adds and subtracts is similar, except that the exponent fields are merely compared to one another to determine if the value of one of the exponent fields is sufficiently larger than that of the other to warrant concern that an exception will occur.

If an exception prediction has been made, and the computation ultimately results in an exception occurring, an interrupt signal is generated, giving notice of the occurrence to the program running the system. The exception is handled, and the floating point computation re-executed.

BRIEF DESCRIPTION OF THE DRAWINGS

Fig. 1 is a diagrammatic representation of a data processing system capable of floating point computations, configured to include the method and apparatus of the present invention;

FIGS. 2A-2D are plots of possible exceptioncausing situations for the multiply, divide, add/subtract, and unary floating point operations: and FIG. 3 is a schematic diagram of the apparatus used to form the exception-predicting circuitry.

DETAILED DESCRIPTION OF THE INVENTION

The present invention is implemented in a data processing system architecture, designated generally in FIG. 1 with the reference numeral 10, comprising a pair of processor units: A central processor unit (CPU) 12 and a floating point processor unit (FPU) 14. The CPU and FPU 12 and 14 receive a periodic clock signal developed by a clock (CLK) source 16, and both are connected to a memory system 18 by a data bus 20. Only the CPU 12 connects to the memory system 18 by an address bus 22.

The CPU 12 directs system operation in that instructions are sequentially accessed from the memory 18 through addresses formed by a program counter (PC) 24 of the CPU 12. As will be seen, addresses can also be supplied the memory system 18 by the exception program counter (EPC) 26, which is multiplexed to the address bus 22 by any conventional technique. Each accessed instruction, however, is examined by the FPU 14, but only the floating point computation instructions are acted upon by the FPU 14; all other instructions are executed by the CPU 12. The reasons for this particular architecture design will become clearer below.

Not specifically shown in FIG. 1 is the fact that the architecture of the data processing system 10, and in particular that of the CPU 12, is of a configuration that is typically referred to in the art as a "pipelined" architecture. This permits a number of sequential instructions accessed from the memory 18 to be in various states of execution simultaneously. While each instruction is in a state of execution, the memory address of that instruction is temporarily held in a program counter (PC) queue 28 of the CPU 12. The various parameters are held, during execution, in a parameter register file 30.

The FPU 14, as shown in FIG. 1, is connected to the data bus 20 to receive instructions and operands at instruction decode unit 34 and operand registers 36, respectively. The exponent fields of the operands are communicated from the operand registers to an exception prediction unit 38 by signal lines 40. The entire operands (exponent field and fraction fields) are coupled to a floating point execution unit 42. The exception prediction unit 38, as the name implies, operates to determine whether the resulting floating point computation can possibly result in an exception. If so, a CPBusy signal, that is coupled to the CPU 14, is generated. The floating point execution unit 42 performs the actual computation, and, if that computation results in an exception occurring, generates an INTERRUPT signal that is coupled to the CPU 14. An indication of the particular computation to be performed is coupled, in the form of operation code (OP) signals, to the exception prediction unit 38 and the floating point execution unit 42. In the former case, the OP signals operate to select the criteria against which the operand exponent fields are tested to predict exceptions; in the latter case the OP signals control the computation.

The pipeline of the present embodiment of the data processing system 10 is five instructions deep: that is, as many as five instructions can be in various stages of execution at the same time. The five definable execution stages are:

1. An instruction fetch (I) stage during which the instruction is accessed, using an address contained in the PC 24, from the memory 18 for decoding;
2. A decode and register access (R) stage, during which an initial decoding of the instruction takes place and the registers containing the operands, as designated by the instruction, are accessed;
3. An arithmetic execution (A) stage which starts various arithmetic operations, such as any floating point computations;
4. A memory operation (M) stage; and
5. A write (W) stage in which the results of the operation are written to a register (not shown) of the system 10 (i.e., the CPU 12 or FPU 14) or to the memory 18.

Instructions that are sequentially accessed from the memory 18 can be in any one of these stages (I, R, A. M and/or W) during operation at any moment in time.

As is known, various instructions take different times to execute. For example, a fixed point integer instruction takes one cycle to execute; load and store operations take two cycles, whereas floating point operations (computations) can take as many as 19 cycles.

Consider a floating point computation that ultimately results in an exception. The instruction is accessed from the memory 18 and is examined by both the CPU 12 and FPU 14. However, the instruction is executed only by the FPU 14 and, therefore, goes through the I stage, the R stage, and the A stage during which operands are gathered and set to permit the actual computation to begin. The completion of the A stage sets floating point execution unit 42 in motion, with the result being ready 1 to 19 cycles later, depending upon the operation (i.e., add/subtract or multiple/divide). Thus, depending upon the particular computation called for by the instruction (e.g., add, subtract, multiple, or divide) some period of time will elapse before the result of the computation is available. While the computation occurs however, the CPU 12 has accessed other instructions and placed them in the "pipeline" so that when the floating point instruction reaches the M stage of execution, the instructions that follow successive instructions are completing at least their respective I, R and A stages of execution. Some, depending upon how long the floating point computation took, may have even completed the M stage.

If it is found that the result of the floating point instruction produces an exception, the instruction must be adjusted and re-executed. But what of the instructions that followed the floating point instruction? In this pipelined architecture, the system 10 must either temporarily store the results of the subsequent instructions, or discard them entirely, while the exception is handled (e.g., the operands adjusted to avoid an exception) and the floating point instruction is re-executed, using the modified operands. The problems, of course, are that these techniques place either a substantial time loading on the system, or require additional, and complex, circuitry to be added to the system.

The present invention is directed to predicting in advance whether catching an exception is possible. Accordingly, at the completion of the arithmetic execute state, A, but before the computation is actually initiated, a prediction is made to determine if it is possible that an exception will, in fact, occur.

In the present invention floating point operations can be in single precision (using single precision operands) or double precision (using double precision operands). Single precision operands are 32 bits in length, with the most significant bit (MSB) forming the sign, the next 8 MSBs forming the exponent field, and the remaining 23 bits forming the fractional part of the operand. In double precision, the MSB again forms the sign while the next 11 MSBs form the exponent field and the remaining 52 bits form the fractional part, for a total of 64 bits.

The present invention, however, is not necessarily dependent upon the size of the operands. For the sake of simplicity, therefore, the operands are assumed to have an exponent field of only three bits. Referring now to FIGS. 2A-2D, the plots of the exponent fields of operands relative to one another are illustrated for multiply, divide, add/subtract, or unary computations/operations. (A unary operation is one in which only one operand is involved such as, for example, complementation, incrementing, absolute value, and like operations.)

FIGS. 2A-2C are rectangular cartesian coordinate plots of the exponent fields for the two operands of floating point computations. The x's at certain of the coordinates indicate those exponent field values which will, or can possibly, cause a floating point exception—for the operation of the plot (e.g., a multiply operation in FIG. 2A). Those exponent field values lying along the dotted lines 50 (50a–50d) indicate predictions at which it is possible that an exception will occur during the corresponding operation of the Figure.

One way of viewing FIGS. 2A-2D is that they represent, for each of the floating point operations (i.e., multiply, divide, add, subtract or unary), criteria selected by the operation to be performed, against which a combination of the exponent fields are compared.

The operand exponent fields for floating point multiply are added together, and the operand exponent fields for a floating point divide are subtracted from one another, before compared to the criteria indicated in FIGS. 2A and 2B. Thus, for example, if a floating point multiply instruction is exceeded using operands having exponent fields of "100" and "110" is to be executed, their sum ("1010") in combination with an indication of the operation to be performed (multiply) would give rise to a prediction of the computation resulting in a floating point exception.

In the case of floating point adds or subtracts, the operand exponent fields are compared to one another to determine if one is much larger than the other, as indicated by the criteria shown in FIG. 2C. Unary operations merely require a look at the exponent field of the operand to determine if it falls within the possible exception-causing criteria shown in FIG. 2D.

The exception prediction unit 38 is illustrated is in greater detail in FIG. 3. As shown, the operand exponent fields ($E_1$, $E_2$) are received from the operand registers 36 (FIG. 1) by a programmable logic array (PLA) 51. The PLA 51, which also receives the OP signals from the instruction decode unit 34, operates to predict exceptions for add and subtract operations, according to the criteria illustrated in FIG. 2C. The output terminal (O) of the PLA 51 is coupled to an exception prediction latch circuit 52 via a two-input OR gate 54. The exception prediction latch circuit 52 generates the CPBusy signal that is coupled to the CPU 14.

The operand exponent fields ($E_1$, $E_2$) are treated somewhat differently for multiply and divide operations than as described above with respect to add or subtract operations. The operands to be used in a multiply or a divide computation are coupled to an adder circuit 60, where they are added together, or are subtracted from one another, depending upon whether the OP signals indicate a multiply or divide operation, respectively. The result is coupled to a PLA 62 which operates to compare that result to the criteria (FIGS. 2A, 2B) set up or selected by the OP signals received by the PLA 62 from the instruction decode circuit 34 (FIG. 1). The output (O) of the PLA 62 is received at the other of the two inputs of the OR gate 54, so that when the selected criteria and the result of the combination of the exponent fields indicate an exception, as determined by the PLA 62, the CPBusy signal will become active. As will be seen, for reasons that will become evident as this discussion continues, the CPBusy signal operates to temporarily hold the CPU 14 in a wait state until the completion of the floating point computation.

In operation, the CPU 12 performs the memory system 18 accesses (for instructions and operands, or to store data, as is usual in normal data processing operations), using addresses provided by the PC 24 (FIG. 1). Each accessed instruction is communicated to both the CPU 12 and FPU 14, but the FPU 14 only recognizes and executes floating point instructions; all other instructions are executed by the CPU 12. Each instruction will go through the five decoding stages (I, R, A, M, and W) discussed above. Thus, at any moment in time, there will be five instructions in various stages of execution in the system 10.

Assume that, during this operation of the data processing system 10, a floating point instruction is accessed from the memory system 10. The instruction is initially inspected by both the CPU 12 and the FPU 14, but, as indicated above, only the FPU 14 will process the instruction. The floating point instruction is processed through the I stage to the R stage, so that when the A stage is reached the data processing system 10 has one instruction (the one that immediately followed the floating point instruction of this example) reaching the R stage of execution, and is accessing another for the I stage.

During the A execution stage of the floating point instruction, the exponent fields ($E_1$ and $E_2$) of operands for that instruction are coupled to the exception prediction unit 38 of the FPU 14 (FIG. 1). If the computation is a multiply or divide instruction, the OP signals operate to (1) select the add or subtract function of the adder 60, (2) select the criteria against which the result produced by the adder 60 is to be compared via PLA 62, and (3) enable the output (0) of the PLA 62, while at the same time inhibiting the output (0) of the PLA 51. Conversely, if the computation to be performed is an add or a subtract operation, the output of the PLA 62 is disabled, and the output of the PLA 51 enabled, to pass the result of the PLA 51 to the exception latch 52 (via the OR gate 54).

At the end of the A execution stage of the floating point instruction, the exception prediction is available. If that prediction is that the floating point computation will not result in an exception, the CPBusy signal line will remain inactive, the CPU 12 will continue its operation, and the floating point execution unit will complete the computation.

Of more interest is when one of the PLAs 51 or 62 (depending, of course, upon the operation) predicts that an exception will occur. The prediction activates the CPBusy signal which, when communicated to the CPU 12 from the exception latch circuit 52 (FIG. 3), temporarily halts any operation of the CPU 12. For the time being, no further accesses are made of the memory system 18, and execution of the two instructions that followed the floating point instruction will be held in abeyance; they will remain in their respective I and R stages of execution. The floating point instruction, however, proceeds to completion: The floating point execution unit 42 (FIG. 1) will continue carry out the computation (e.g., add, subtract, multiply, etc.) called for by the floating point instruction.

If, at the completion of the computation, a floating point exception occurs as predicted, the floating point execution unit 42 will activate an INTERRUPT signal. The INTERRUPT signal is communicated from the FPU 14 to the CPU 12, causing the CPU 12 to awaken from its temporarily halted state, with the knowledge that a floating point exception has occurred. The handling of the exception is now up to the software, or more accurately the programmer, to perform the necessary steps to handle the exception.

At the time the INTERRUPT signal is received by the CPU 12, the address of the floating point instruction causing the interrupt is moved from the PC queue 28 to the EPC 26, and used to access the memory system 18 to determine the location of the operands (in the system 10) that are the object of the floating point instruction. The software routine, entered as a result of the occurrence of the INTERRUPT signal, now makes whatever modifications are necessary to the operands, using any one of several known techniques that are not part of the invention herein. The last part of the software sets the content PC 24 to the address of the instruction immediately following the floating point instruction and turns control of the system back to its normal operation. The system 10 now proceeds as before, executing the floating point instruction with the adjusted operands. and accessing the following instructions to place them in the pipeline for execution.

I claim:

1. In a data processing system of the type having at least a pair of processor units, a one of processor units being operable to perform floating point computations on first and second operands, each having an exponent field and a fractional field, the other processor units being operable to perform other data processing tasks in parallel with floating point computations being performed by the one processor unit, a method of performing floating point computations, the method comprising the steps of:
    forming, for each different type of floating point computation to be performed by the one processor unit, floating point exception causing criteria;
    comparing a combination of the exponent fields of the first and the second operands to the floating point exception causing criteria for the floating point computation to be performed;
    generating a floating point exception prediction signal when the comparing step indicates, pursuant to the criteria used, the possibility that an exception will occur;
    temporarily halting operation of the other processor unit in response to existence of the floating point exception prediction signal;
    performing the floating computation; and
    resuming operation of the other processor unit if the computation does not result in an actual floating point operation.

2. The method of claim 1, including the steps of:
    generating an interrupt signal when the completion of the computation results in the actual floating point exception;
    resuming operation of the other processor unit in response to the interrupt to handle the floating point exception by, in part, adjusting the floating point operands causing the exception; and
    re-executing the floating point computation with the adjusted floating point operands.

3. In a data processing system of the type having pipelined architecture in which instructions are decoded and executed in stages, the data processing system including a computational unit being operable in response to floating point instructions to conduct floating point computations involving at least two operands, each operand having an exponent field, and a fractional field, apparatus for handling floating point exceptions resulting from floating point add, subtract, multiply, and divide operations, the apparatus comprising:
    means for comparing the exponent fields of the two operands to criteria determined by the floating point operation to be performed on the operands to generate therefrom a prediction signal indicative of the possibility of the floating point exception occurring;
    means responsive to prediction signal for stalling operation of the data processing system until completion of the floating point operation;
    means for generating an interrupt signal at the completion of the computation when a floating point exception has occurred; and means for handling the floating point exception and resuming operation of the data processing system with re-execution of the floating point instruction.

4. In a data processing system of the type having at least a pair of processor units, a one of processor units being operable to perform floating point computations on first and second operands, each having an exponent field and a fractional field, the other processor unit being operable to perform other data processing tasks in parallel with floating point computations, apparatus for handling floating point operation exceptions, the apparatus comprising:

in the one processor unit:
first circuit means for comparing the floating point operands to first predetermined criteria for add, subtract, and unary computations and for generating a first signal when the comparison indicates the possibility of a floating point exception occurring;
second circuit means for comparing a combination of the exponent fields of the first and the second operands to second predetermined criteria for floating point multiply and divide computations and for generating a second signal when the comparison indicates the possibility of a floating point exception occurring;
generating means for providing a floating point exception prediction signal when the first or the second signals are present; and
the other processor unit including means for halting operation in response to and during occurrence of the floating point exception prediction signal.

5. The data processing system of claim 4, including means for generating an interrupt signal at completion of the floating point computation when the computation results in a floating point exception; and means for handling the exception.

6. The data processing system of claim 5, wherein the means for handling the exception includes means for adjusting the operands, and means for resuming operation of the other processor unit with a floating point computation using the adjusted operands.

* * * * *